United States Patent [19]

Grazia

[11] Patent Number: 4,955,783
[45] Date of Patent: Sep. 11, 1990

[54] DEVICE FOR FORMING A PILE OF BLISTER PACKS IN AN UPWARD DIRECTION

[75] Inventor: Alessandro Grazia, Crevalcore, Italy

[73] Assignee: I.M.A. Industria Macchine Automatiche S.p.A., Ozzano Emilia, Italy

[21] Appl. No.: 322,425

[22] Filed: Mar. 13, 1989

[30] Foreign Application Priority Data

Apr. 13, 1988 [IT] Italy .................. 3410 A/88

[51] Int. Cl.$^5$ .................. B65G 57/30
[52] U.S. Cl. .................. 414/795; 414/795.3
[58] Field of Search .................. 198/621; 414/790.1, 414/790, 790.9, 791, 795, 795.3, 900, 788.2

[56] References Cited

U.S. PATENT DOCUMENTS

| | | | |
|---|---|---|---|
| 3,387,719 | 6/1968 | Moore | 414/795 |
| 3,568,860 | 3/1971 | Rawlins | 214/6 |
| 3,837,504 | 9/1974 | Foeke et al. | 414/795 |

FOREIGN PATENT DOCUMENTS 0091670 10/1983 European Pat. Off. .
2051014 1/1981 United Kingdom .

Primary Examiner—Joseph F. Peters, Jr.
Assistant Examiner—Edwin L. Swinehart
Attorney, Agent, or Firm—Stevens, Davis, Miller & Mosher

[57] ABSTRACT

The device comprises two facing parallel walls and a back wall, which forms a stacking station where two facing pairs of series of discs, which form eccentrics, act on related rings, which feature teeth, which in turn work alternately and in conjunction with one another to lift and pile up blister packs supplied to the station by a feed line, and ears fitted with arms in order to control the rotation of the rings. Two pairs of belts featuring segments pick up the pile of blister packs from the station, lifting it up, and then two further pairs of belts lift the pile in their turn, conveying it out of the device.

9 Claims, 7 Drawing Sheets

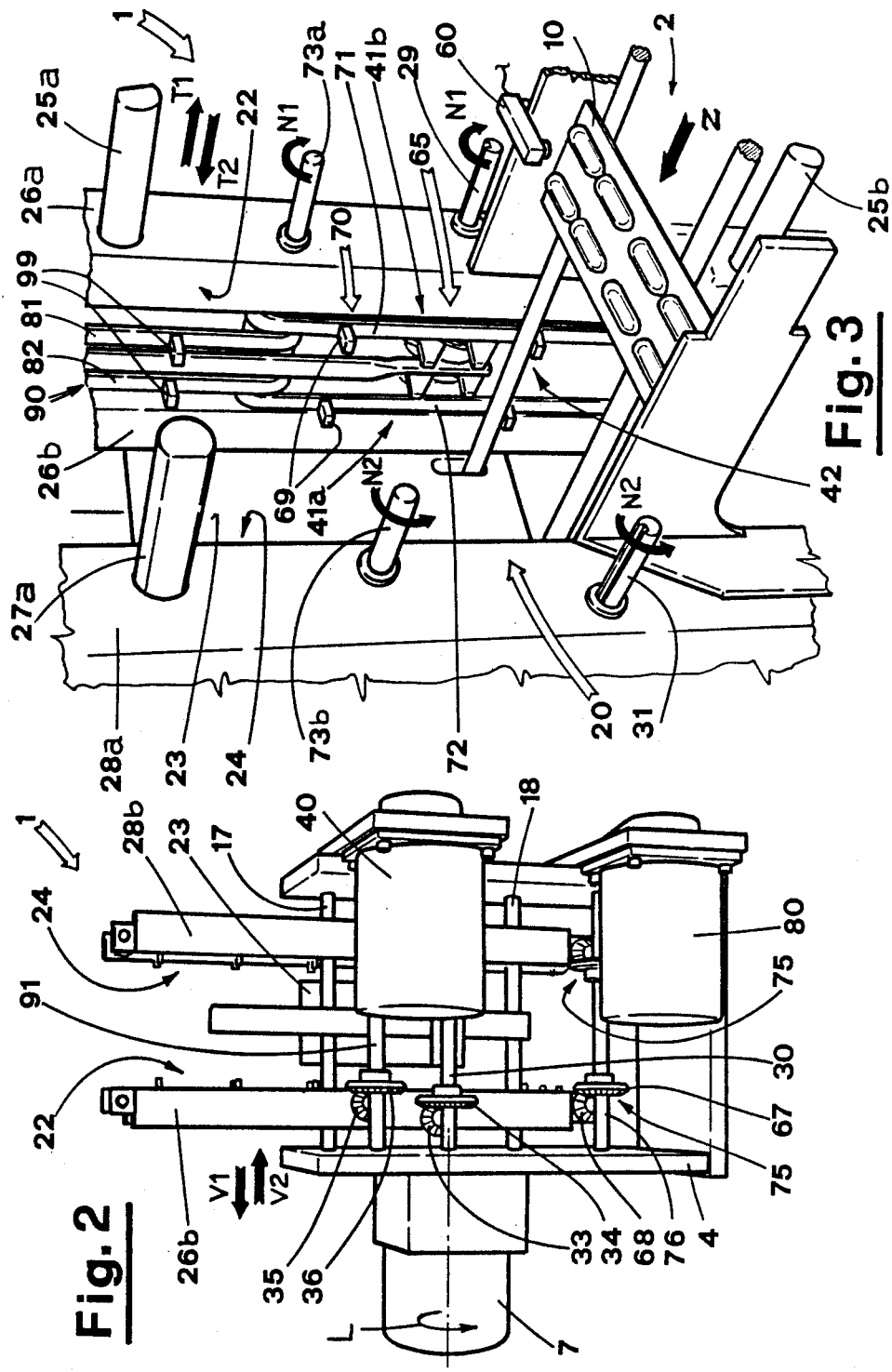

DEVICE FOR FORMING A PILE OF BLISTER PACKS IN AN UPWARD DIRECTION

BACKGROUND OF THE INVENTION

The present invention concerns a device for forming a pile of packs of sundry articles, in particular pharmaceutical articles such as pills, capsules or tablets, these packs being commonly known as blister packs.

DESCRIPTION OF THE PRIOR ART

There are various known devices or apparatuses able to form piles, generally comprising one or more blister packs, containing sundry articles, in particular pharmaceutical articles such as pills, capsules or tablets, and destined for subsequent insertion in corresponding cartons.

The devices forming the piles of blister packs can be summarily classified in two categories: the first including devices which form the pile of blister packs in an upward direction, while the second include those which form the pile of blister packs proceeding in the opposite direction, which is to say in a downward direction.

In one of the said apparatuses, designed to form the pile of bliser packs in an upward direction, the blister packs are stored in a vertical magazine. Groups of blister packs are periodically picked up from the bottom of the magazine, each group comprising a predetermined number of blister packs, by means of suitable pushers, that operate transversely to the magazine, and are, together, subsequently made to enter special moving buckets by means of the same pushers, or by falling.

The blister packs are subsequently picked up, still together and again by means of pushers, and inserted in their related cartons.

A large number of faults are possible during the operation of the aforementioned apparatus.

The pusher can indeed push an incorrect number of blister packs out from the bottom of the vertical magazine, because of imperfect planarity in the blister packs due to the different thermal expansion coefficients of the materials in which they are made, or due to the undesirable results of any unevenness to which the blister pack strip is subjected during transfer.

The blister packs are in fact generally curved to some extent, this causing variations in the height of the piles of blister packs to be picked up from the magazine.

A known device is, on the other hand, designed in such a way that it separates the individual blister packs stacked in the magazine. It comprises a series of supports located by the lower part of the magazine and connected to an equal number of electromagnet armatures.

The supports located in facing and superimposed pairs, are made to operate by energising the corresponding electromagnets in cyclical stages, such that they are made to project from the inside of the walls of the vertical magazine, forming a rest for the blister pack located immediately above them, or such that they are made to return, allowing the same blister pack to fall.

The pairs of supports are located at a regular distance from one another in the vertical plane that is equal to distance between the edges of two consecutive blister packs in the pile in the magazine.

The cylindrical alternate operation of the electromagnets of the upper pairs and lower pairs of supports causes a blister pack to be released for each cycle, this blister pack falling below the magazine onto collector means.

Once the predetermined number of blister packs has been reached, the latter are then inserted into their related cartons.

This type of device forms a pile of blister packs proceeding from the top downwards.

The supports usually engage with the longitudinal edges of the blister packs in order to avoid the possibility of the bottom blister pack in the pile buckling under the weight of the blister packs above it, and thus falling even when the supports project from the walls of the magazine.

Notwithstanding this, however, the blister packs can curve to such a degree that the edges of two consecutive blister packs are able to occupy the space between the upper and lower supports, causing an error in the number of blister packs contained in the pile being formed.

A different type of device, that operationally and structurally connects a blister-pack thermoforming unit with a cartoning unit, comprises a series of channels whose development is such that they gradually extend over several different height levels.

Blister packs coming from the cutting station of a thermoforming and filling machine are periodically inserted in these channels.

A blister pack is inserted in each channel every time by a series of pushers operating downstream of the cutting station, a further series of pushers moving the blister packs along the channels when all the channels have been filled.

The ends of the channels lead at increasing levels to the inside of a well where the blister packs accumulate in a pile.

The pile of blister packs is then moved from the well and along a channel by means of a pusher until it is deposited on a conveyor line which transfers it to the cartoning machine.

A further known device, this time of the kind operating in an upward direction, comprises a die taking the form of a metal plate with holes whose size is the same as the desired dimensions of the blister packs, and of one or more punches located below the die, each at a point corresponding to a hole.

The blister pack strip, already filled with the related articles and closed off by a metal film that has been made to adhere to it, slides along between the die and punches.

The punches are operated in synchrony with the forward motion of the blister pack strip such that when the group of articles to be included in a blister pack is located in an area corresponding to a hole, the corresponding punch is raised.

The upper part of each punch features a seat, such that its edges cut the blister pack strip against the die without crushing the articles inside.

Once the blister pack strip has been cut, the punch stops and then moves back to its initial position, while the base of the seat, comprising a plate which is moved independently by means of rod that slides inside the stem of the punch, continues its movement, lifting the blister pack further.

A vertical magazine designed to contain the stacked blister packs is located above the die in an area corresponding to each hole.

When the plate is filtered, it thus inserts the blister pack in the magazine, adding it to the pile from below.

The lower end part of the magazine is designed to enable the blister packs to enter vertically while, however, preventing them from falling out in the opposite direction.

It comprises, for example, two hinged walls whose upper edges are at the bottom of the magazine, and which are held in a vertical position by means of suitable elastic means.

The lower edges of the walls feature stops facing the inside of the magazine.

Under the pushing action of the plate, the blister packs cause the two walls to open outwards, moving beyond the area occupied by the stops.

The walls subsequently close again, retaining, thanks to the stop, the pile of blister packs, whose weight is not sufficient to cause the walls to open again.

Horizontal ridges on the inside surfaces of the lower end part of the magazine can be used instead of the two walls.

Alternatively, the inside part of the walls themselves can feature a series of ridges designed to act together with or instead of the stops.

Smaller-sized plates are located above the blister packs, supported by sliding rods subjected to the action of elastic and shock-absorbing means. These said plates are designed to prevent the high operating speed of the punch and plate from causing the upper blister packs in the pile to bounce, be jolted or moved out of position.

A pusher, operating transversely to the wall, periodically picks up a predetermined number of blister packs from the top of the pile, sending them to a cartoning machine.

It is clear that the operation of the punch and plate in this latter solution necessarily precludes operation of the pusher, which, considering that there is a return stroke for every outward stroke of the punch, plate and pusher, means that there are many and long periods of dead time in the operating cycle of the device as a whole.

A device for forming a pile of blister packs, proceeding in an upward direction, and operating in a similar mode to that just described, is protected by the U.K. No. 2 051 014.

In this device the blister packs which have just been formed are individually picked up by a mechanical arm which places them on a conveyor belt that is divided into cells by means of baffles that are hinged upon it; a single blister pack being placed in each cell.

A vertically moving plate is located at the opposite end of the belt from that where the blister packs are loaded, the blister packs being individually unloaded onto this plate by the belt.

The belt is able to continue its movement, curving under the plate, thanks to the fact that it is possible for the baffles to rotate around the point where they are hinged.

After each blister pack has been transferred to the plate, the latter is moved up to a first preset level, causing the blister pack to be inserted in a first collection chamber, located at the same first level.

This operation is repeated until the number of blister packs in the first chamber reaches the preset number.

Whilst the last blister pack in the series is being raised, the plate continues its lifting movement to a second level, above the first level, moving the entire pile of blister packs up to a second collection chamber, located above the first collection chamber. The blister packs are picked up together from this second chamber, the pile being sent to the cartoning machine.

This latter device, however, as well as all those considered above, also suffers from the same above-mentioned disadvantages of periods dead time, as a result of the fact that they all use parts, such as pushers, which operate with an alternating and intermittent rectilinear motion.

In addition to this, all the above-mentioned devices are open to operating problems involving the selection of the correct number of blister packs for every group pile packaged, due to the fact that the blister packs are never perfectly flat.

The same number of blister packs can thus occupy different vertical spaces.

It is furthermore, impossible to quickly and simply adapt the devices described above to operate with different sizes of blister packs from those for which the devices were built.

In other words the known devices are characterised by particularly poor versatility.

SUMMARY OF THE INVENTION

The object of the present invention is to propose a device able to form a pile of blister packs, proceeding in an upward direction, that is able to run at a high operating speed without this being limited by the presence of dead time, and without the blister packs handled suffering further changes in shape.

A further object of the invention is to propose a device that is able to count the blister packs that are piled up without the possibility of there being any errors due to the imperfect planarity of the blister packs.

An additional object of the present invention is to propose a device that always sends the blister packs to the cartoning machine in the correct number, irrespective of their shape (curving).

Finally, it is also an object of the present invention to propose a device that includes the possibility of adjustment for both the dimensions of the blister packs to be piled up and packaged, and for the number of blister packs to be included in each final package.

The aforementioned objects are obtained by means of a device for forming a pile of blister packs, in an upward direction, the said device being of the type which comprises: a support structure; a blister pack feed line; a station for collecting the said blister packs, formed by two facing vertical walls, between which the aforementioned line ends, and a vertical back wall, with the said side and back walls mounted on the aforesaid structure; first means for supporting and stacking the said blister packs, operating at this said station; second means for picking up a pile of blister packs and transferring it upwards from the above-mentioned station; third means for conveying the aforesaid pile of blister packs outside the said device, the latter being characterised by the fact that the said first support and stacking means, housed inside related seats in the aforementioned walls, are divided up into at least two facing pairs of series of first means, driven in synchrony with one another, with the said first means being divided up into two groups driven in synchrony with one another, such that they alternate cyclically with one another following a series of positions located at different levels from one another, in a first stage in which the said first means, belonging to the said first group, move, protruding from the aforementioned walls, in an upward direction, causing a blister pack to be raised by the same first means in the said first group, striking against its edges, and with the aforesaid first means belonging to same second group moving, inserted inside related seats, in a downward direction, and in a second stage in which the said first means in the first group move, inserted in related seats, in a downward direction, causing the above-mentioned blister pack to be released either above a second blister pack, previously picked up from the aforesaid line and raised by the same first means in the said second group, or, if there is no such latter second blister pack, directly on to the above-mentioned first means in the said second group, which are made to move, protruding from the said walls, in an upward direction; in addition being characterised by the fact that the said second means for picking up a pile of blister packs and transferring it in an upward direction comprises fourth driven rest means, which operate in synchrony with the formation of a pile of the said blister packs in an upward trajectory in order to lift the aforementioned pile of blister packs, resting on the aforementioned first means, and raise it above the above-mentioned station.

BRIEF DESCRIPTION OF THE DRAWINGS

The characteristics of the invention not to have emerged thus far are emphasised hereinafter with specific reference to the enclosed tables of drawings, in which:

FIG. 2 is a rear view in perspective of the device shown in FIG. 1, with some of its parts not shown for greater clarity;

FIG. 3 shows an enlarged detail, in perspective, of the device in FIG. 1;

DESCRIPTION OF THE PREFERRED EMBODIMENT

Figure 1:
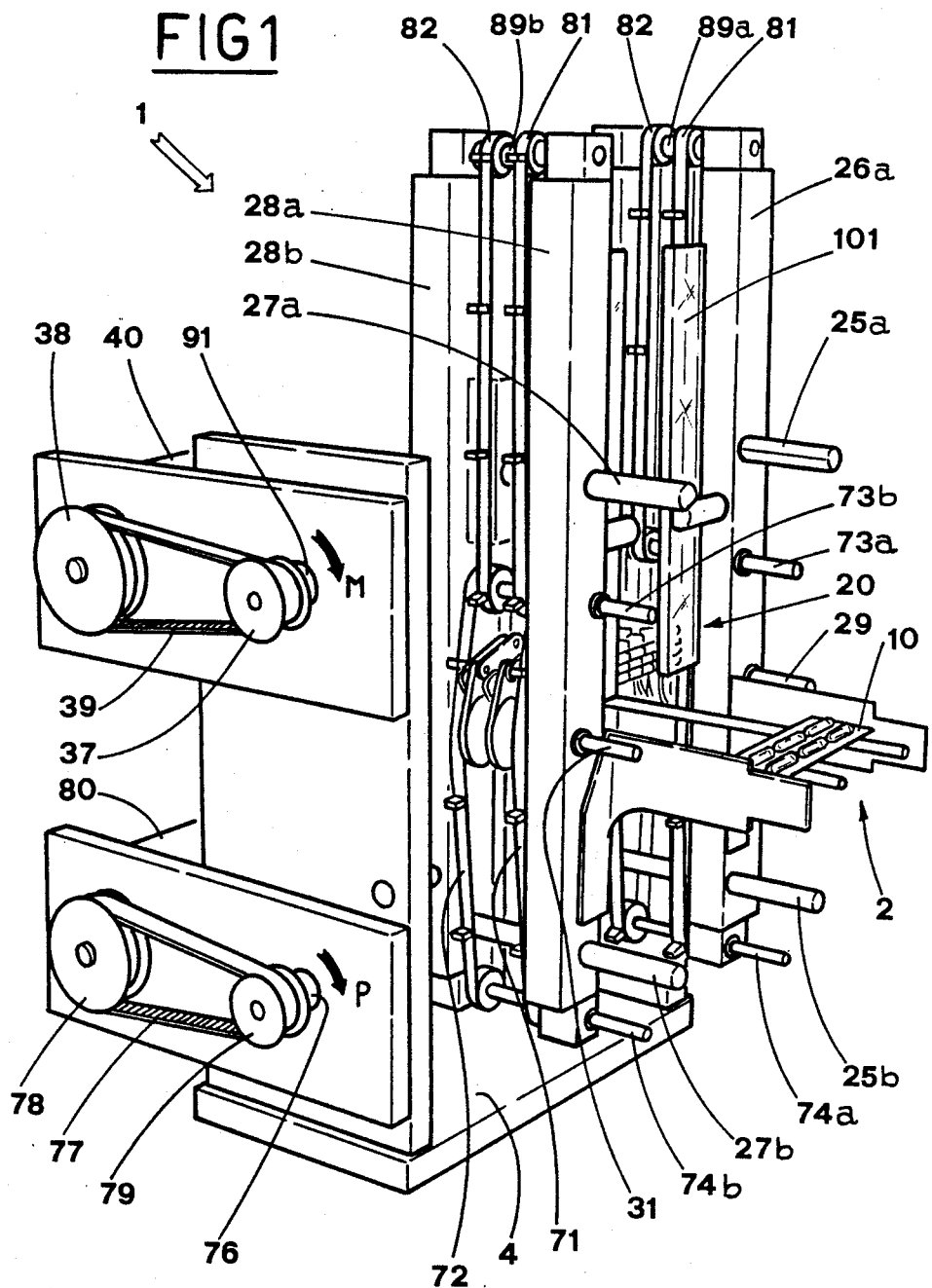
FIG. 1 is an illustration in perspective of the essential components of the device which is the subject of the present invention.

With reference to FIGS. 1, 2 and 3, the device which is the subject of the present invention has been labelled 1.

This device is located at the end of a feed line 2, which supplies blister packs 10 coming from a device (not illustrated, but that of known type) which fills the compartments in a blister pack strip subsequently closed off by a metal film and then cut into smaller portions, each containing a preset number of articles and known as a blister pack.

The blister packs 10 are conveyed along the line 2 in a direction Z by means of transfer means not illustrated (such as a conveyor belt, for example), which can be actuated continuously or intermittently.

The line 2 ends at a blister collection station 20. The station is formed by two facing vertical walls 22 and 24, and a back wall 23.

A fourth wall 101, (made in transparent material for example), for closing off the front of the station, is located so that its lower edge is situated immediately above the line 2, while however leaving enough space for the blister packs to pass between this lower edge and the line itself.

The front and back walls may be removed, enabling one to gain access to the inside of the station in order to carry out any maintenance operations.

Each side wall 22 and 24 comprises a pair of bars 26a, 26b, 28a, 28b, that are located vertically parallel to one another, forming the apexes of a quadrilateral.

The pairs of bars 28a, 28b and 26a, 26b are located bilaterally in relation to the terminal point of the line 2.

The rear bars 26b and 28b feature horizontal holes which pass through them perpendicular to the line 2, and at different levels from one another.

Two horizontal guides 17 and 18, fitted to a support structure 4 of the device, run through these holes.

The two rear bars can in this way be moved horizontally, either by hand or using automatic mechanical means, in a direction that is transverse to the line 2, in opposite directions V1 and V2.

Two pairs of cylindrical metal rods 25a, 27a and 25b, 27b, parallel to the line 2 but located at different heights from one another, are fitted at one end to the rear bars 26b, 28b.

The remaining part of the rods 25a, 27a and 25b, 27b run through suitable holes made in the front bars 26a and 28a in order to support the latter.

This makes it possible to move the front bars 26a and 28a, either manually or with the help of automatic mechanical means, in opposite directions T1, T2, parallel to the line 2, with an excursion that is limited by the length of the rods themselves.

Figure 4:
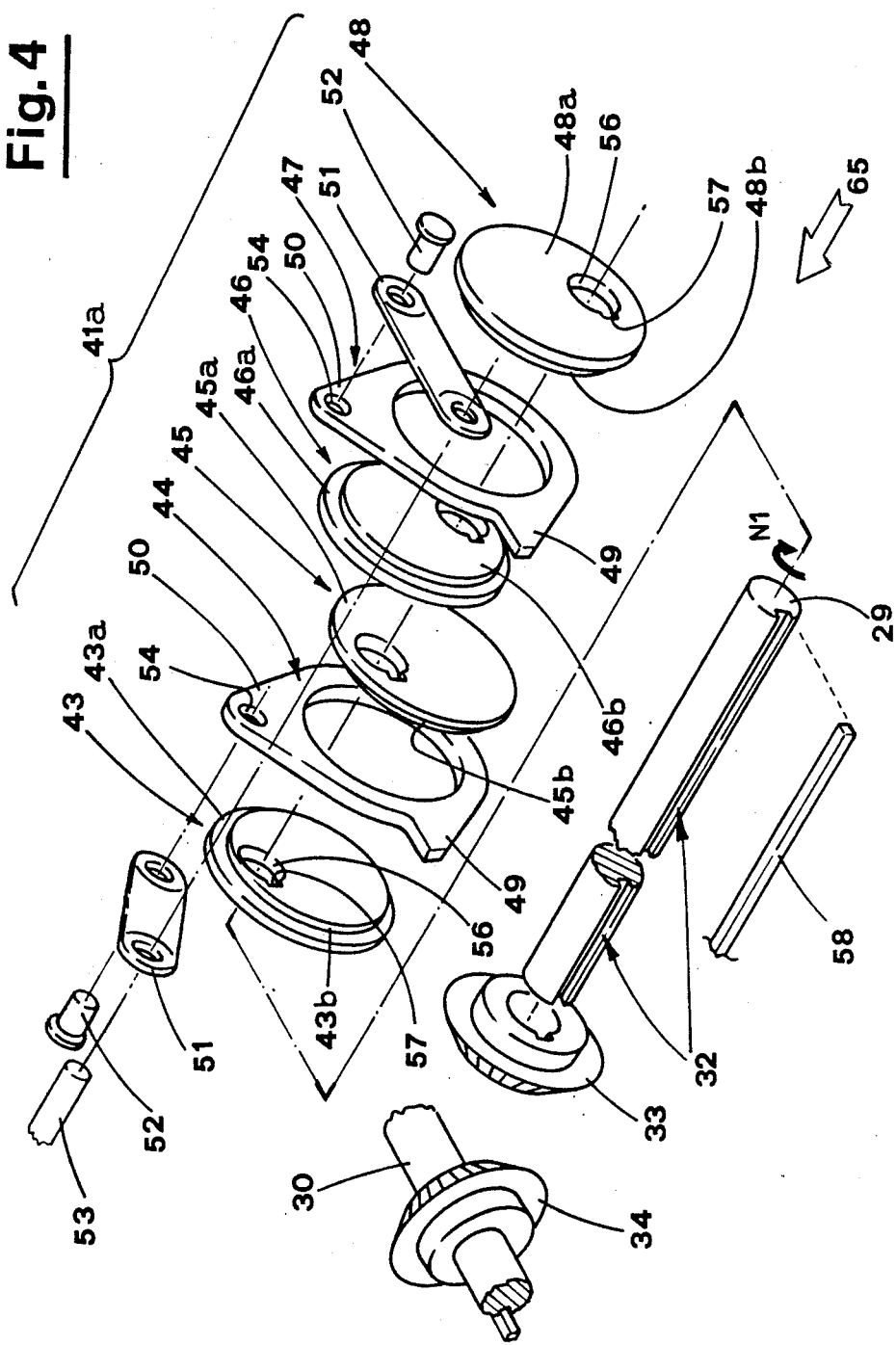
FIG. 4 is an exploded view showing a detail of the same device.

Support and stacking means 65 (FIG. 4) operate at the station 20, located at the same height in their related seats 42 (FIG. 3), formed by the space between the bars 26a and 26b as well as 28a and 28b, respectively located on either side of the line 2, the said means being constructed as described below.

Two drive shafts 29, 31, parallel to the above-mentioned rods 25a, 27a, each run through holes made in their related pair of bars 26a, 26b and 28a, 28b in such a way that it is possible for them to rotate upon their axes.

Shafts 29 and 31, which are at least as long as the rods 25a, 25b, 27a, 27b feature a longitudinal groove which runs along their entire length.

Keyed to the ends of shafts 29 and 31 are the same number of pinions 33, which engage with corresponding crown wheels 34, keyed to a first motor axle 30, and made to rotate upon its axis in direction L by a motor 7, laterally supported by the structure 4 (FIG. 2).

The shafts 29 and 31 are thus made to counter-rotate upon their axes in opposite directions N1 and N2.

The part of each shaft situated between the related front and rear bars runs through holes in two series 41a and 41b of support and stacking means 65, comprising discs 43, 45, 46 and 48, and rings 44 and 47, shaped and assembled as specified below.

The first series 41a of discs and rings comprises, in order: a first disc 43, divided into two sections, respectively first 43a and second 43b, with the latter having a smaller diameter than the former, and featuring a hole 56 whose axis is offset from the axis of the disc; a ring 44 whose internal diameter is slightly larger than the diameter of the second section 43b of the disc 43, and is slightly thinner than double the thickness of this same latter section; a second disc 45 whose construction is symmetrical to that of the first disc; a third disc 46, whose construction is similar to that of the first disc 43, but differs in a featuring a hole located in a position that is diametrically opposite that of the hole in the first disc; a second ring 47 that is identical to the first ring 44; a fourth disc 48, whose construction is symmetrical to that of the third disc 46.

The holes 56 in the discs in their turn feature a slot 57, which enables them to be driven round by the shafts thanks to a key 58 inserted in the groove 32 in the latter, and engaging in slot 57.

The first 43 and second 45 two discs, as well as the third 46 and fourth 48 discs, are located with the surface of their smaller-diameter sections, 43b, 45b, and 46b, 48b respectively, in contact with one another, such that the same sections are located inside the corresponding ring 44 or 47 situated between them.

In this way a pair of eccentrics 55a and 55b is created (FIG. 5a), which are offset by 180 degrees to one another, and made to rotate by the action of the key 58.

Each ring 44 or 47, subjected to the action of the related eccentric 55a or 55b, also features a tooth 49 and an ear 50, located at a predetermined angle from one another, such as, for example, 90 degrees.

Each ear 50 features a hole 54 that runs through it so that the end of an arm 51 can be made to pivot on it by means of a mounting pin 52, the opposite end of this arm 51 being made to pivot on the related wall by using a pin 53 fixed to the wall itself.

In this way the axial rotation of the rings is controlled by the ears, with the latter facing upwards.

The arms 51 are thus able to turn upon the axes of the mounting pins 52, in counter-rotating directions Q1 and Q2, and of the pins 53, in counter-rotating directions S1 and S2, making it possible for the related eccentrics 55a and 55b (FIG. 5b) to move the rings 44 and 47 with a traversing motion.

Figure 6:
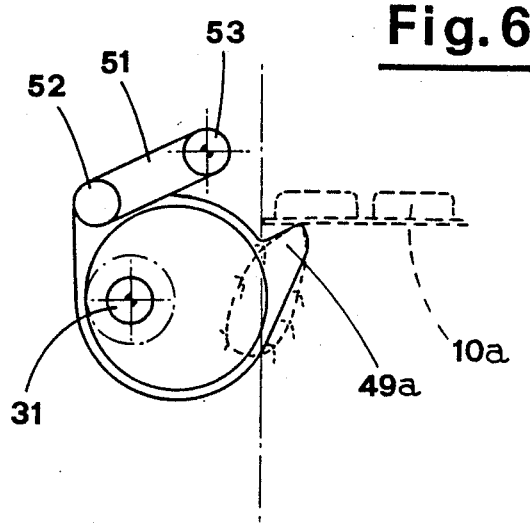
FIG. 6 shows, in diagrammatic form, the positions taken up by component 49 during the relevant stages illustrated in FIGS. 5a, b, c, d, e, f.

The rotation of the shafts 29 and 31 makes the teeth 49 of each ring move through a trajectory shown by the broken line in FIG. 6.

The teeth of each contiguous pair are obviously staggered.

To be more specific they move with a cyclical alternating motion through a series of positions A, B, C, D, E and F located at different levels.

Figure 5A:
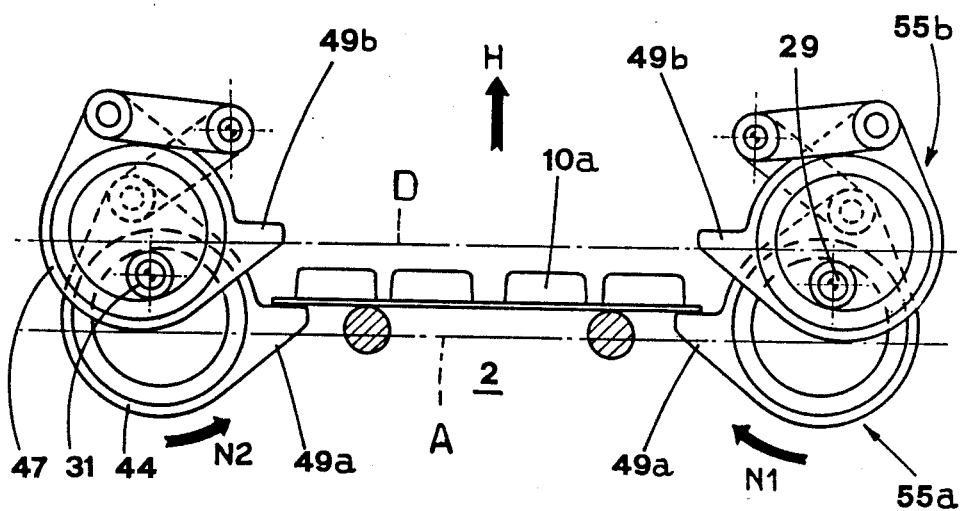
FIGS. 5a, b, c, d, e, f, g are details of the device, showing the positions of its parts during different stages in the operation of the device.

With reference to FIGS. 5a, b, c, d, e, f, 49a indicates the tooth-type for the rear ring 44, and 49b indicates the tooth-type for the front ring 47 of a pair of rings in a series 41a or 41b.

The teeth 49 may ideally be divided into two groups, the first comprising the rings in all the series 41a, 41b corresponding to tooth-type 49a, and the second comprising the rings of the same series corresponding to tooth-type 49b.

For the sake of simplicity, the descriptions below will refer to two series 41a, located so that they face one another on shafts 29 and 31 respectively.

It is to be understood that the remaining facing series 41b operates at the same time as series 41a, performing a succession of identical symmetrical movements. The movements performed by series 41a are described below.

In FIG. 5a the teeth 49a are located in a position marked A, at the same height as the end zone of the line 2.

In synchrony with its taking up this position, a first blister pack 10a arrives along the line 2 moving into position at the station 20, with its edges above the teeth 49a.

Figure 5B:
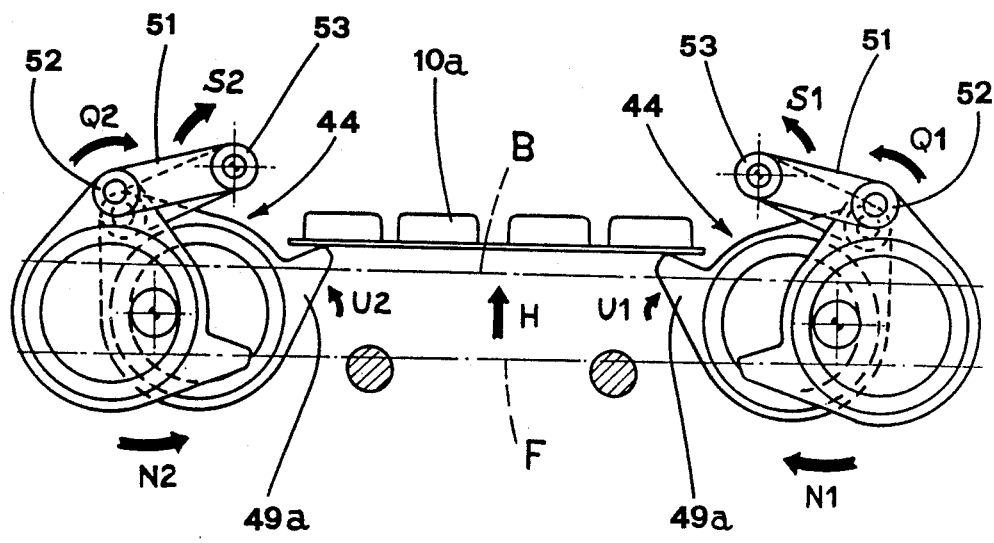

The rotation of the two shafts 29 and 31 in counter-rotating directions N1 and N2 respectively, causes the first blister pack 10a to be raised by the action of the teeth 49a, which move in an upward direction H, until they are situated in position B, at a height higher than that of the line 2 (FIG. 5b).

The simultaneous rotation of the arms 51 in counter-rotating directions S1 and S2 respectively, upon the axes of the related pins 53, and in counter-rotating directions Q1 and Q2 respectively, upon the axes of the related mounting pins 52, at the same time causes the rings to rotate in counter-rotating directions U1 and U2, further raising the blister pack 10a.

Figure 5C:
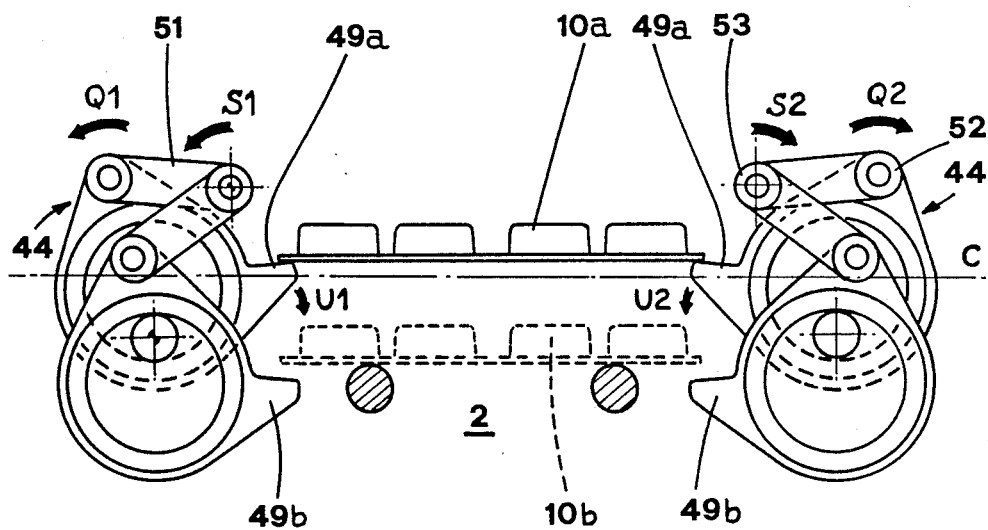
Figure 5D:
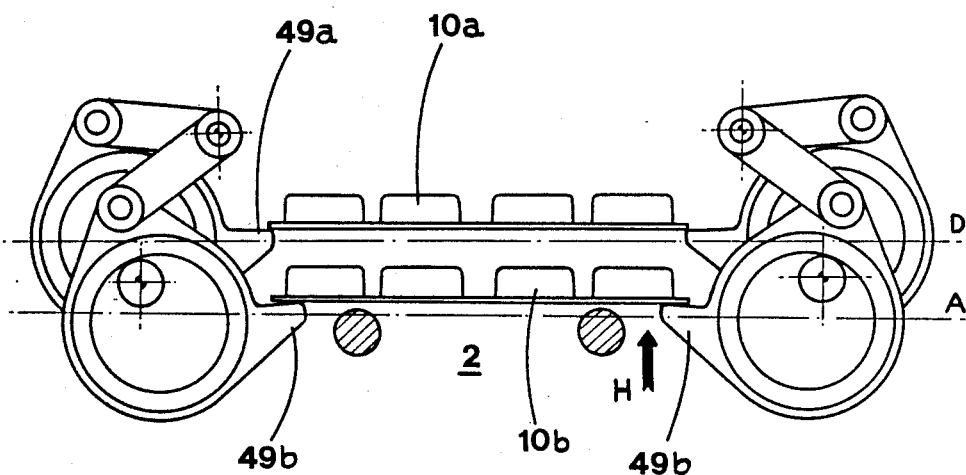

The rotation of the eccentrics subsequently brings tooth 49a into position C (FIG. 5c), the height of which does not, however, differ appreciably from that of position B, thanks to the rotation of rings 44 in a counter-rotating direction U2 and U1, opposite to the previous directions, as a result of the rotation of the arms 51 in counter-rotating directions S2 and S1 respectively, upon the axes of the related pins 53, and in counter-rotating directions Q2 and Q1 respectively, upon the axes of the related mounting pins 52. Continuing through their cycle, the teeth 49a move to position D (FIG. 5d), at a height slightly below that of position C.

At the same time, teeth 49b move to position A, previously occupied by teeth 49a in the stage illustrated in FIG. 5a.

In synchrony with their taking up this position, a second blister pack 10b (illustrated by the broken line in FIG. 5c), arrives at the end section of the line 2, and is then lifted by teeth 49b, moving in an upward direction H.

The teeth 49b thus move through the same sequence as described above for teeth 49a, raising blister pack 10b.

The teeth 49a, moving in a downward direction K, move to position E (FIG. 5e), sliding out from beneath the edges of the blister pack 10a, which is thus stacked with blister pack 10b, supported by teeth 49b (obviously in cooperation with the remaining teeth 49b in the other series 41b not illustrated in FIGS. 5a-f).

There are three different operating modes for effecting this stacking stage.

A first mode involves disengaging the teeth 49a from the edges of the blister pack 10a, effected during the same moment in which the upper surface of the blister pack 10b which is moving upwards, touches the lower surface of the blister pack 10a which is moving downwards.

A second mode, on the other hand, involves the aforesaid disengagement of the teeth 49a from the edges of blister pack 10a being effected before blister pack 10b comes into contact with blister pack 10a.

Blister pack 10a thus falls on to blister pack 10b, remaining stacked upon it.

A third mode, finally, involves the disengagement of the teeth 49a from the edges of the blister pack 10a being effected after blister pack 10b comes into contact with blister pack 10a, this disengagement being effected by raising the latter blister pack above the teeth 49a by means of blister pack 10b which is moving upwards.

The operating modes of the device obviously depend on the height of the blister packs and, for blister packs of the same height, on the dimensional characteristics of the eccentrics, arms and rings.

Teeth 49a then move to position F (FIG. 5f), at a height slightly above that of the line 2, while teeth 49b move to position B.

Finally, teeth 49a return to position A and the cycle is repeated as described above.

Sensor means 60 (FIG. 3), operating in conjunction with electronic counting means (not illustrated in that of known type), are located toward the end stretch of line 2, detecting the passage of each blister pack 10.

When the above-mentioned counting means detect the passage of a preset number of blister packs, such as two, for example, means 70 are actuated for picking up and transferring the blister packs stacked in the station 20 in an upward direction.

Means 70, which operate at the station 20, comprise two pairs of toothed belts 71 and 72 both of which run in a closed loop around a related pair of gears and are located bilaterally in relation to each pair of series 41a, 41b of support means 65.

The upper gears around which belts 71 and 72 run, are mounted so that they idle on two axles 73a and 73b, whilst the lower ones are keyed to second rotating axles 74a and 74b (FIG. 1) parallel to shafts 29 and 31, driven in axial counter-rotation in opposite directions N1 and N2 by pinions 68, keyed, respectively, to their ends, which engage with corresponding crown wheels 67 together with which they form crown wheels and pinions 75 (FIG. ~2).

The crown wheels 67 of crown wheels and pinions 75 are keyed to an axle 76, parallel to axle 30, that is driven round so that it rotates in a preset direction P by an electric motor 80, of the step-by-step type, for example, and which acts on it by means of two pulleys 78 and 79, around which a belt 77 runs in a closed loop.

Figure 5E:
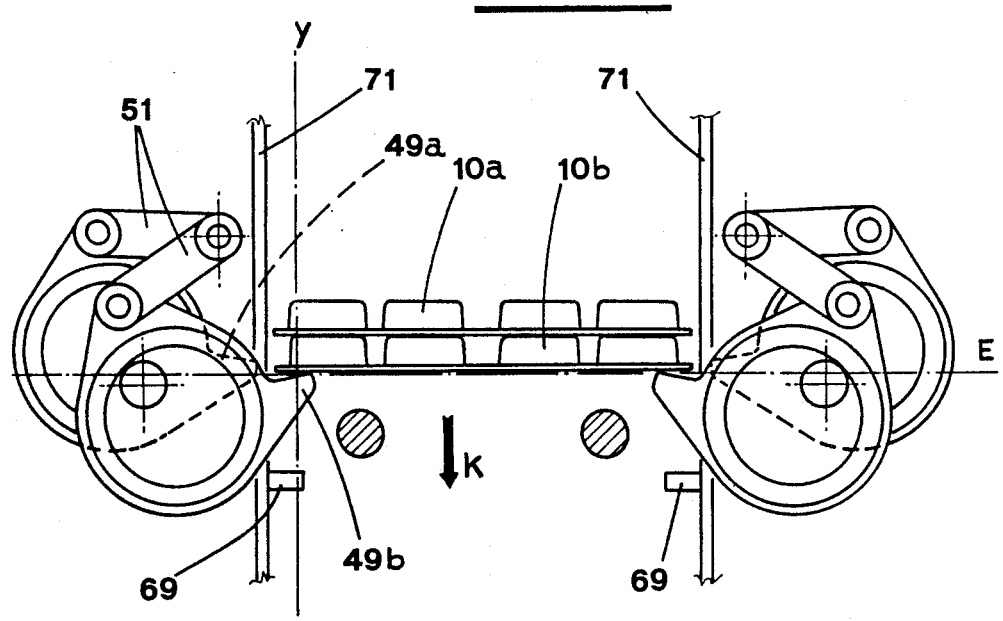
Figure 5F:
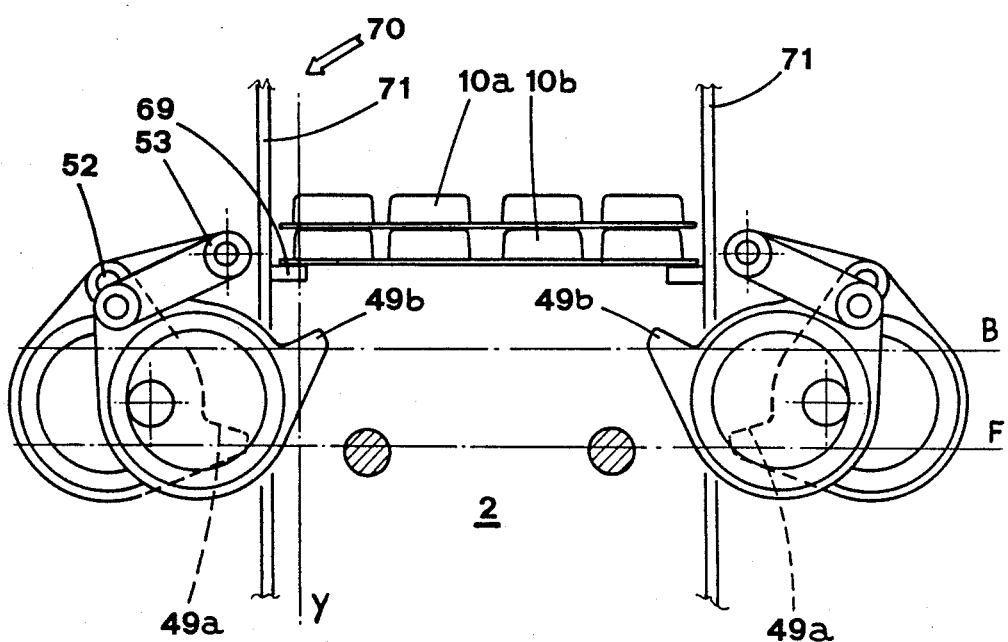

Rest means 69 are fitted to belts 71 and 72; these rest means 69 taking the form of segments that are locked perpendicularly to the same belts, and being located so that they are equidistant from one another (FIGS. 5e, f).

The belts 71 and 72 are positioned such that the segments 69 on the runs facing the inside of the station 20 lie in horizontal planes W.

Figure 5G:
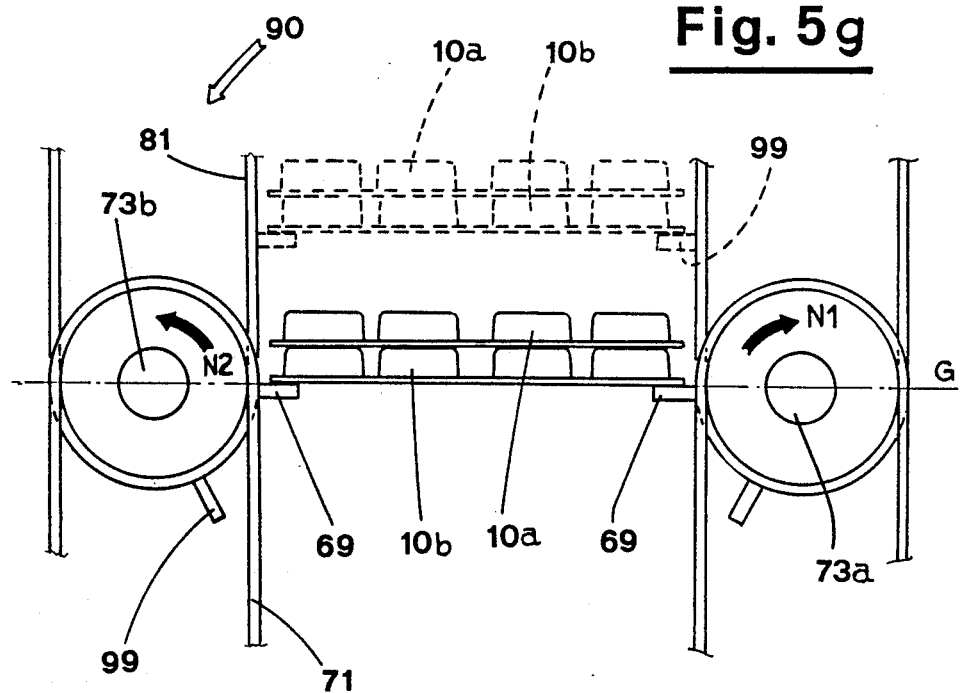

As a result of this the rotation of belts 71 and 72 causes the segments 69 situated in the same plane W, located immediately below the line 2 (FIG. 5e) to pick up, when they are raised, the pile of blister packs 10a, 10b supported by the teeth 49 (FIG. 5f), and lift them out of the station 20, raising them above the latter to a preset level G (FIG. 5g).

At this point the belts 71 and 72 are stopped and the pile of blister packs 10 is picked up by means 90 (FIG. 5g), which are designed to convey them outside the device.

The said means 90 comprise, for example, at least two pairs of facing belts 81, 82, whose construction is similar to that of belts 71 and 72, between which they are partially interposed.

Each belt 81 and 82 runs in a closed loop around a pair of gears, located with their axes of rotation parallel to line 2.

The upper gears of these latter belts are mounted in idle on two fixed axles 89a and 89b, which are horizontally supported by vertical walls 22, 24. The remaining gears of these latter belts are keyed to the first axles 73a and 73b, upon which the gears of belts 71 and 72 (FIG. 3) are also mounted in idle.

Axles 73a, 73b are made to rotate in counter-rotating directions N1 and N2 by means of corresponding pinions 35 keyed to their respective ends and engaging with the related crown wheels 36.

Crown wheels 36 are, in their turn, keyed to a third drive axle 91 (FIGS. 1 and 2) which is made to rotate in a direction M by a motor 40, (an electric motor, for example), by means of a belt 39 that runs in a closed loop round two pulleys 37 and 38 that are keyed, respectively, to one end of axle 91 and to the shaft of motor 40 (FIG. 1).

The belts feature stops 99 (FIG. 5g) which are fitted to them perpendicularly and located in pairs on either side of station 20 as well as above the same.

In this way the stops 99, which are located in superimposed and equidistant horizontal planes, move to a position in which they are vertically situated at station 20 in the same way as segments 69.

The belts 81 and 82 are made to move, when the pile has been completed, following actuation of motor 40, such that the stops 99, situated in the same horizontal plane, pick up a pile of blister packs 10a, 10b resting on the segments 69 if the belts 71 and 72 located below, which are situated in position G (FIG. 5g), and convey it out of the device where it will subsequently be received by another line (not illustrated) that will convey it to a cartoning machine (also not illustrated).

The device which is the subject of the present invention has clear advantages over the known devices.

A first advantage consists in the fact that the device can easily and simply be adapted to different sizes of blister packs.

The station 20 can be adjusted to different widths by sliding the bars 26b and 28b, together with the corresponding bars 26a and 28a, along the guides 17 and 18, whilst the length may be adjusted by sliding bars 26a and 28a along rods 25a, 25b and 27a, 27b respectively.

A further advantage consists in the fact that it is not necessary to interrupt operation of the device in cases where the flow of blister packs on line 2 is interrupted for a certain period of time when the pile of blister packs in the station 20 has not yet been completed.

In this case the blister packs, or blister pack, already located upon, for example, the teeth 49a are unloadeed onto teeth 49b which are not supporting any blister packs and are in a raised position above them, without increasing the height of the pile.

The blister packs are subsequently unloaded again on to empty teeth 49a and so on cyclically until the flow of blister packs returns to normal, completing the pile.

As a further advantage, it is possible for the operating speed to reach high values, above all thanks to the elimination of all dead time, due to the lack of any parts, such as pushers, for example, operating with an alternating rectilinear motion involving empty return strokes.

The flow of blister packs can be continuous in that as soon as a blister pack has been lifted from line 2, into station 20, up to a level that is only slightly higher than its height, a second blister pack can already be inserted below the first one and then picked up, without waiting for a return stroke to be completed, continuing with the stacking of the pile.

The pick-up of the pile from the station 20, effected by intermittently motor-driven belts 71 and 72, thus eliminating pushers or other devices requiring a momentary stop in the stacking of the subsequent pile, also contributes to increasing the smoothness, speed and reliability with which the device operates.

The above-mentioned advantages are increased by the fact that the operation of belts 71 and 72, actuated intermittently, is coupled with that of the further pair of belts 81 and 82.

Furthermore, with blister packs having the same vertical dimensions, the belts are able to operate with piles of any number of blister packs.

The number of blister packs making up each pile is set simply and rapidly on the electronic counting means without the need for any other adjustments to the device.

The counting of the blister packs, in accordance with the preset number, is effected, as described above, at the entrance of the former to the station 20, through the operation of means 60, and is thus not influenced by the shape of the blister packs, or the height they occupy.

These latter advantages optimise the versatility of the device, in that they eliminates the need to effect any operations altering the size of the magazines, collector chambers or buckets, which cannot, on the other hand, be avoided with the devices described in the introduction.

It is understood that the device described herein is solely an unlimited example, such that possible variations in the construction details, such as, for example, the number of series 41a, 41b of rings and discs on each shaft 29 and 31, which can vary, will not affect the protective framework afforded to the invention as described above and claimed hereinafter.

What is claimed is:

1. A device for forming a pile of blister packs and moving said pile in an upward direction, said device comprising: a support structure; a feed line for blister packs; a station for collecting said blister packs, said station being formed by two facing vertical side walls, and a vertical back wall, with said side and back walls mounted on said structure and with said line ending between said vertical side walls; first means for supporting and stacking said blister packs, said first means being located inside said vertical side walls; facing first and second pairs of eccentric means, each pair of said eccentric means being identical in construction and reciprocally staggered by an equal number of degrees, with an axis of each pair of said eccentric means being parallel to the direction by which said blister packs enter said station; a ring for each one of said eccentric means mounted thereon; each ring defining a tooth; an eccentric means from each of said first and second pairs of eccentric means forming facing first and second groups, said first and second groups alternating cyclically with one another following a series of positions located at different levels from one another, in a first stage said teeth of said first group protruding in an upward direction so as to engage with the edges of a blister pack located in said station and raise said blister pack while said teeth belonging to said second group move in a downward direction, and in a second stage said teeth belonging to said first group moving in a downward direction thus causing said blister pack to be released upon a second blister pack picked up from said line and supported by said teeth of said second group, with said teeth of said second group projecting in an upward direction, or else, if there is no blister on said teeth of said second group, said blister pack is directly released upon said teeth of said second group.

2. The device as in claim 1, wherein each said ring defines an ear and including an arm for each of said ears, said arm pivoting on a related ear and on a related wall in order to control the axial rotation of a related ring.

3. The device as in claim 2, wherein each one of said eccentric means comprises two discs, each disc defining a first and second section, said second section having a diameter that is smaller than a diameter of said first section and not larger than an internal diameter of said ring and a pair of parallel shafts, said discs being keyed onto said pair of parallel shafts.

4. The device as in claim 3, wherein said discs are eccentrically mounted on each of said shafts, each said disc having a hole off-set in respect of its axis, with said shaft, said hole having a slot therein and said shaft having a longitudinal groove, and including a key inserted into said groove and engaging with said slot made in said hole.

5. The device as in claim 3, including a first motor axle, pinions keyed onto ends of said shafts and crown wheels engaging said pinions keyed onto said first motor axle, said motor axle being supported by said support structure and made to move axially in a predetermined direction, said shafts being made to rotate in opposite directions by said pinions engaging said crown wheels.

6. The device as in claim 1 including second means which operate synchronously with the formation of a pile of blister packs, in order to pick up said pile and transfer said pile upwards from said station, said second means comprising: at least two facing pairs of belts and gears, fitted inside said walls and running in a closed loop, said gears having their axis parallel to the direction by which said blister packs enter said station; a number of segments perpendicularly fitted to said belts, with said segments on inner runs of said belts situated in vertical planes, when at said station, and in parallel horizontal planes, with at least one of said horizontal planes being located immediately below said line; said belts being operated synchronously with the formation of a pile in said station.

7. The device as in claim 6, wherein said second means further comprise: first axles supported by said support structure, said gears being rotatably mounted on said first axles, second axles supported by said support structure, said gears being keyed onto said second axles; a pinion keyed onto an end of each of said second axles; a motor axle supported by said structure and made to rotate in a predetermined direction; two crown wheels, each of said wheels being keyed onto an extremity of said motor axle and engaging with a related pinion, so that said second axles are made to rotate in opposite directions.

8. The device as in claim 1, including means for conveying said pile of blister packs, said means for conveying comprising: idle gears and rotating gears, at least two facing pairs of belts, running in a closed loop around said gears; first axles supported by said support structure, said idle gears being rotatably mounted on said first axles, second axles supported by said support structure, said rotating gears being keyed onto said second axles; a pinion keyed onto an end of each of said second axles; a motor axle supported by said structure and made to rotate in a predetermined direction; two crown wheels, each of said wheels being keyed onto an extremity of said motor axle and engaging with a related rotating pinion, so that said second axles are made to rotate in opposite directions, a number of segments perpendicularly fitted to said belts, with said segments on inner runs of said belts situated in vertical planes when at said station and in parallel horizontal planes; said belts being operated in order to pick up a pile of blister packs transferred out of said station and to convey said pile out of said device.

9. The device as in claim 1, wherein said walls include: two pairs of vertical bars, front bars and rear bars respectively; said rear bars defining holes therein, two rods fixed to each one of said rear bars and supporting one of said front bars in such a way that it is possible for said front bars to move along said rods in order to vary the length of said station; two horizontal guides fixed to a support structure, said guides running inside corresponding holes made in said rear bars in such a way that it is possible for said rear bars to move along said guides, together with a related front bar in order to vary the width of said rotation.

* * * * *